USOO5650678A

United States Patent [19]

Yokozawa et al.

[11] Patent Number: 5,650,678
[45] Date of Patent: Jul. 22, 1997

[54] BRUSHLESS DC MOTOR AND BEARING HOLDING THEREFOR

[75] Inventors: Shinjiro Yokozawa, Tokyo; Kesatsugu Watanabe, Nagano-ken, both of Japan

[73] Assignee: Sanyo Denki Co., Ltd., Tokyo, Japan

[21] Appl. No.: 721,933

[22] Filed: Sep. 27, 1996

Related U.S. Application Data

[63] Continuation of Ser. No. 209,428, Mar. 10, 1994, abandoned.

[30] Foreign Application Priority Data

Mar. 12, 1993 [JP] Japan .................................. 5-052071

[51] Int. Cl.⁶ ........................... H02K 5/16; H02K 5/00
[52] U.S. Cl. ........................ 310/90; 310/91; 417/354; 417/353
[58] Field of Search ..................... 310/90, 91; 417/354, 417/423, 353

[56] References Cited

U.S. PATENT DOCUMENTS

| Re. 34,268 | 6/1993 | Muller | 310/67 R |
|---|---|---|---|
| 4,130,770 | 12/1978 | Wrobel | 310/67 R |
| 4,337,405 | 6/1982 | Hishida | 310/43 |
| 4,633,112 | 12/1986 | Miyake | 310/90 |
| 5,028,216 | 7/1991 | Harmsen et al. | 417/354 |

*Primary Examiner*—Steven L. Stephan
*Assistant Examiner*—Elvin G. Enad
*Attorney, Agent, or Firm*—Pearne, Gordon, McCoy & Granger LLP

[57] ABSTRACT

A bearing holder capable of holding therein a pair of bearings while keeping axes of the bearings to be positively aligned with each other and minimizing stress applied to the bearings. The bearing holder which is made of plastic resin and in which the bearings are held is mounted on a housing made of plastic resin. The bearing holder includes a hollow cylindrical holder body which is provided on an inner surface thereof with a plurality of projections inwardly projected therefrom so as to be contacted with an outer periphery of each of the bearings. The projections each are formed so as to continuously extend in a longitudinal direction of the holder body. The holder body is formed at each of both ends thereof with a plurality of slits each extending along each of both sides of each of the slits.

15 Claims, 6 Drawing Sheets

5,650,678

BRUSHLESS DC MOTOR AND BEARING HOLDING THEREFOR

This is a continuation of application Ser. No. 08/209,428, filed Mar. 10, 1994, now abandoned.

BACKGROUND OF THE INVENTION

This invention relates to a brushless DC motor used for an axial fan or the like and a bearing holder of a plastic resin material suitable for use for such a brushless DC motor.

Various kinds of brushless DC motors and fan motors have been conventionally used for a personal computer, a business equipment, a copying machine and the like. Such equipments have been extensively decreased in selling price, so that it is highly demanded to decrease a price of a brushless DC motor. Thus, it has been recently carried out that parts or components of the brushless DC motor such as a bearing holder, a housing and the like are formed of a plastic resin material by injection molding.

For example, U.S. Pat. Nos. 4,806,081 and 5,028,216 each disclose techniques of integrally forming a bearing holder and a housing of a plastic resin material by injection molding. U.S. Pat. No. 4,682,065 discloses techniques of separately forming a bearing holder and a housing of a plastic resin material by injection molding and then integrally joining both to each other. The conventional bearing holder thus formed is mounted therein with two bearings in a manner to be coaxial.

The prior art described above in which the bearing holder is made of a plastic resin material permits a price of a brushless DC motor to be reduced. However, the bearing holder made by the prior art has disadvantages.

One of the advantages is that it is substantially difficult to mount the bearings in both end of the bearing holder while keeping axes of the bearings aligned with each other. More particularly, the bearing holder fails to accomplish alignment of the two bearings in a diametric direction thereof with high accuracy. This brings about an increase in vibration of the bearings during rotation of a rotor, leading to deterioration of durability of the bearings.

Another disadvantage is that an increase in stress of bearings due to a variation in dimensions of the bearing holder with time and due to a variation in temperature causes durability of the bearings to be deteriorated. U.S. Pat. No. 4,682,065 discloses a bearing holder including a structure for reducing such stress, wherein a portion of the bearing holder contacted with bearings is decreased in thickness as compared with a portion thereof uncontacted therewith, to thereby reduce the stress. Nevertheless, the bearing holder disclosed fails to significantly reduce the stress.

SUMMARY OF THE INVENTION

The present invention has been made in view of the foregoing disadvantage of the prior art.

Accordingly, it is an object of the present invention to provide a brushless DC motor which is capable of reducing vibration of bearings during rotation of a rotor, to thereby increase durability thereof.

It is another object of the present invention to provide a brushless DC motor including a bearing holder which is capable of permitting axes of two bearings to be effectively aligned with each other.

It is a further object of the present invention to provide a brushless DC motor including a bearing holder which is capable of minimizing stress applied to bearings.

It is still another object of the present invention to provide a brushless DC motor including a bearing holder which is capable of facilitating mounting of a stator.

It is yet another object of the present invention to provide a brushless DC motor including a bearing holder which is capable of accomplishing positive joining between the bearing holder and a housing which are formed separately from each other.

It is even another object of the present invention to provide a bearing holder which is capable of holding bearings therein while keeping axes of two bearing effectively aligned with each other.

It is a still further object of the present invention to provide a bearing holder which is capable of minimizing stress applied to bearings.

In accordance with one aspect of the present invention, a brushless DC motor is provided. The brushless DC motor includes a stator, a rotor including a revolving shaft and rotated outside the stator, a bearing holder integrally formed of plastic resin so as to hold therein a pair of bearings for supporting the revolving shaft, and a housing formed of plastic resin for fixedly supporting the bearing holder thereon. The bearing holder includes a holder body formed into a hollow cylindrical shape. The holder body is provided on an inner surface thereof with a plurality of projections in a manner to be radially inwardly projected therefrom and spaced from each other at predetermined intervals in a circumferential direction of the holder body. The projections each are arranged so as to be contacted with an outer periphery of each of the bearings to hold the bearings in the holder body and are formed so as to continuously extend in a longitudinal direction of the holder body.

Also, in accordance with this aspect of the present invention, a brushless DC motor is provided. The brushless DC motor includes a stator, a rotor including a revolving shaft and rotated outside the stator, a bearing holder integrally formed of plastic resin so as to hold therein a pair of bearings for supporting the revolving shaft, and a housing formed of plastic resin for fixedly supporting the bearing holder thereon. The bearing holder includes a holder body formed into a hollow cylindrical shape. The holder body is provided on an inner surface thereof with a plurality of projections in a manner to be inwardly projected therefrom and spaced from each other at predetermined intervals in a circumferential direction of the holder body. The projections each are arranged so as to be contacted with an outer periphery of each of the bearings to hold the bearings in the holder body and are formed so as to continuously extend in a longitudinal direction of the holder body without being formed thereon with any parting line.

In accordance with another aspect of the present invention, a bearing holder integrally formed of plastic resin for holding therein a pair of bearings for supporting a revolving shaft is provided. The bearing holder includes a holder body formed into a hollow cylindrical shape. The holder body is provided on an inner surface thereof with a plurality of projections in a manner to be inwardly projected therefrom and spaced from each other at predetermined intervals in a circumferential direction of the holder body. The projections each are arranged so as to be contacted with an outer periphery of each of the bearings to hold the bearings in the holder body and are formed so as to continuously extend in a longitudinal direction of the holder body without being formed thereon with any parting line.

In accordance with a further aspect of the present invention, there is provided a method for manufacturing the bearing holder described above by injecting synthetic resin into a cavity of a mold formed by a combination of a plurality of mold parts. In the method, the plural mold parts each are arranged so that parting surfaces of the mold are positioned in a manner not to cause any parting line to be formed on a surface of each of the projections.

BRIEF DESCRIPTION OF THE DRAWINGS

These and other objects and many of the attendant advantages of the present invention will be readily appreciated as the same becomes better understood by reference to the following detailed description when considered in connection with the accompanying drawings; wherein.

DETAILED DESCRIPTION OF THE PREFERRED EMBODIMENTS

Now, the present invention will be described hereinafter with reference to the accompanying drawings.

Figure 1:
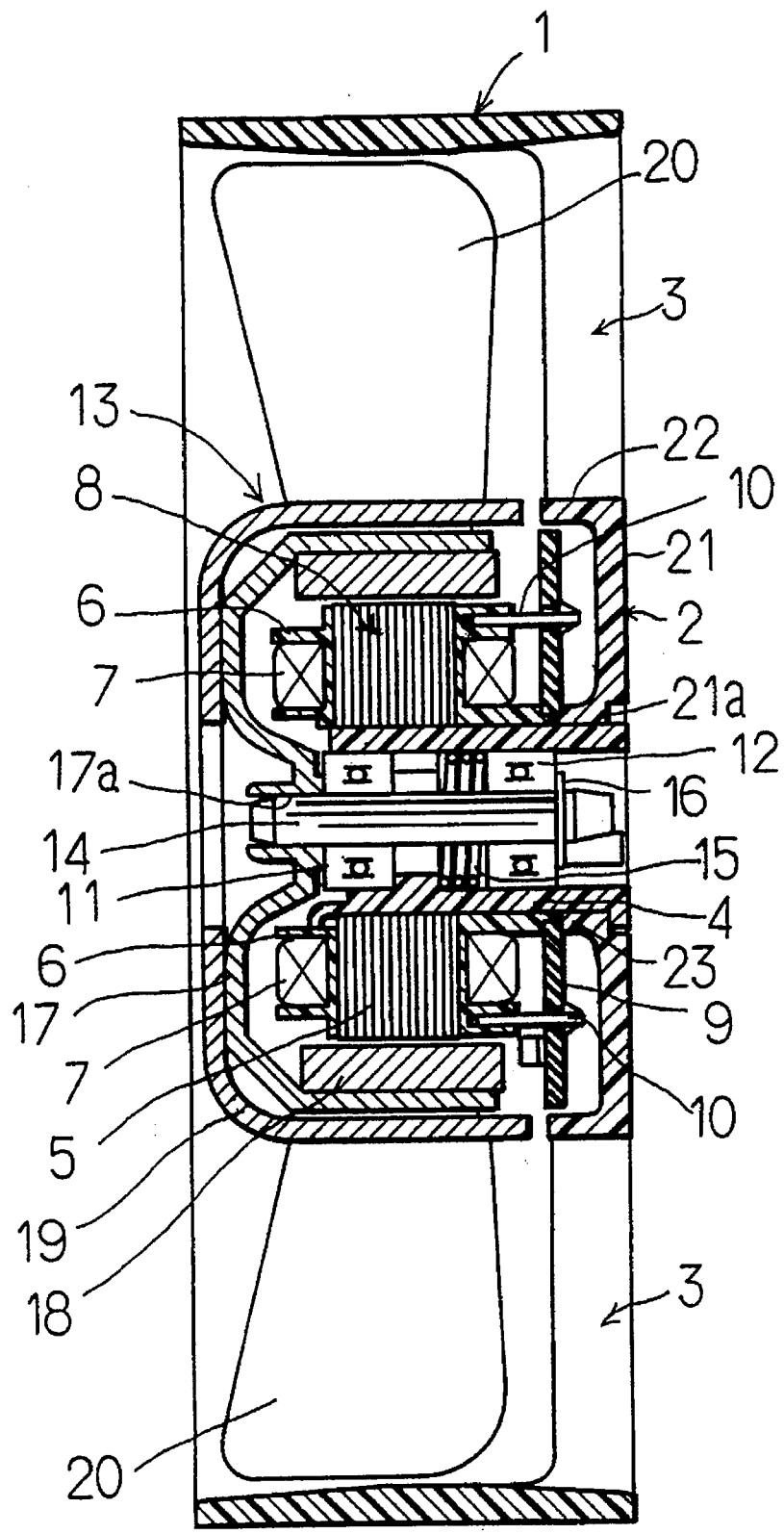
FIG. 1 is a sectional view showing an example of a fan in which an embodiment of a brushless DC motor according to the present invention can be incorporated.
Figure 2:
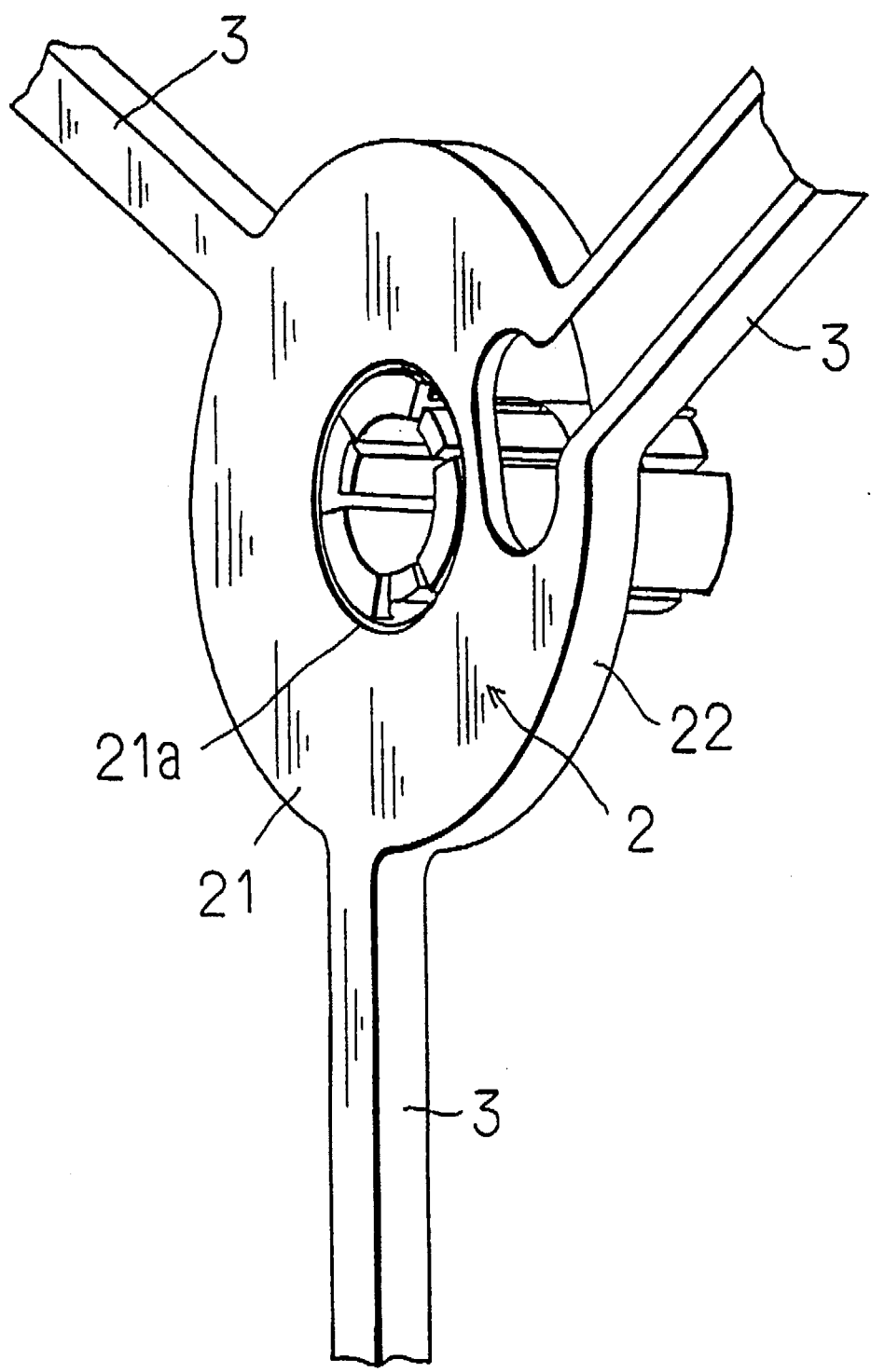
FIG. 2 is a perspective view showing a bearing holder mounted on a housing
Figure 3:
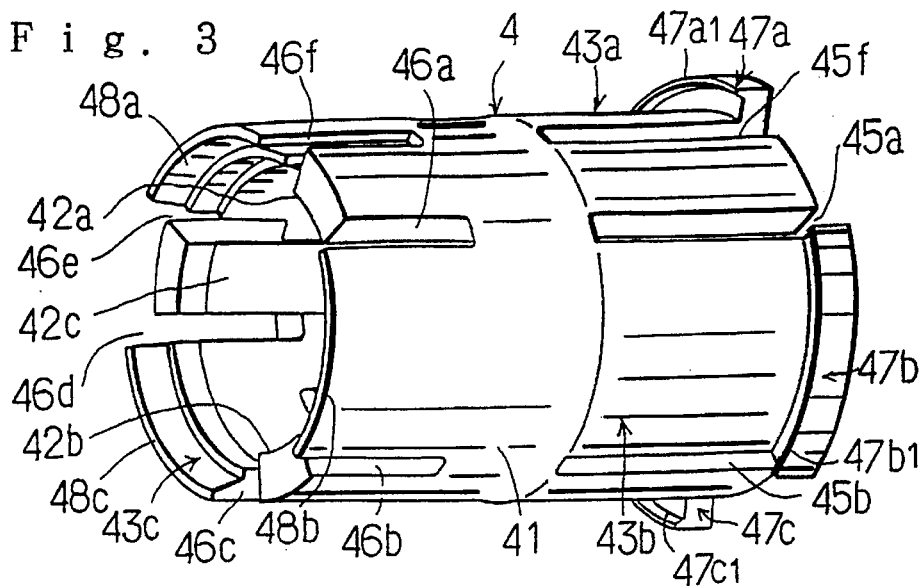
FIG. 3 is a perspective view showing a bearing holder suitable for use in the brushless DC motor shown in FIG. 1.
Figure 4:
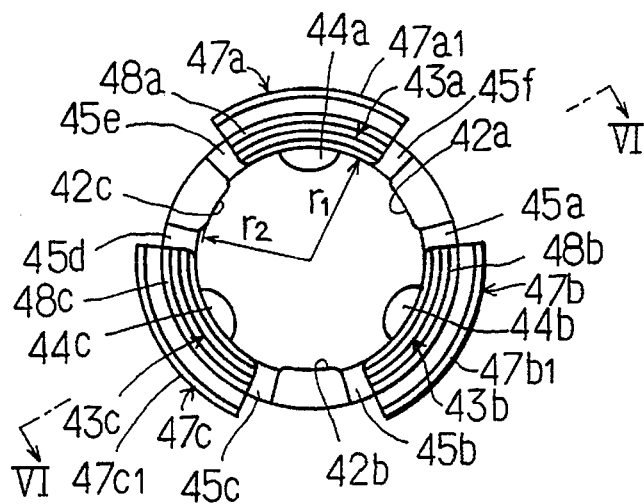
FIG. 4 is a side elevation view of the bearing holder shown in FIG. 3.
Figure 5:
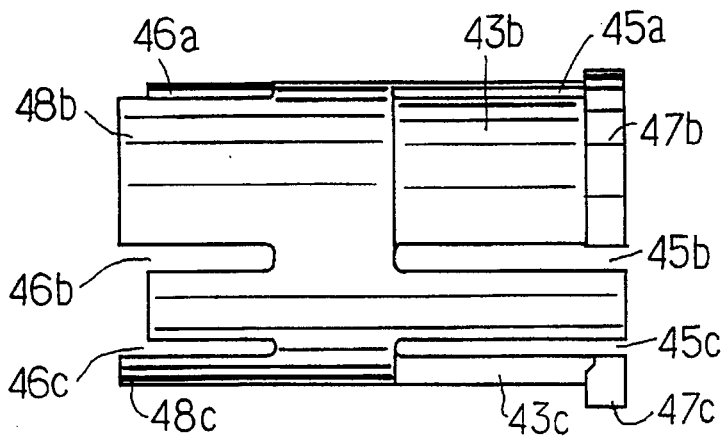
FIG. 5 is a front elevation view of the bearing holder shown in FIG. 3.

Referring first to FIGS. 1 and 2, a fan in which an embodiment of a brushless motor according to the present invention is exemplified. In FIG. 1, reference numeral 1 designates a casing, 2 is a housing for a motor and 3 designates three webs for connecting the casing 1 and housing 2 to each other therethrough. The webs 3 are arranged so as to radially extend from the housing 2. The casing 1, housing 2 and webs 3 are formed of a plastic resin material such as polybutylene terephthalate or the like in a manner to be integral with each other by injection molding. The housing 2 includes a base section 21 which is formed into a shape like an annular flat plate and provided at an inner periphery with an annular cut-out step 21a, an outer cylindrical wall 22 formed so as to extend from an outer periphery of the base section 21 in an axial direction of the housing 2, and an inner cylindrical wall 23 formed so as to extend from the inner periphery thereof in the axial direction of the housing 2. The inner cylindrical wall 23 is fitted therein with a bearing holder 4, which will be detailedly described hereinafter. The bearing holder 4 is fitted thereon with a stator 8 including a core 5, a plurality of bobbins 6 mounted on the core 5 and a winding 7 formed on each of the bobbins 6. The bobbins 6 each are fixedly mounted thereon with a connection pin 10 for making electrical connection between the winding 7 and a circuit pattern of a circuit board 9 including a drive circuit. The connection pin 10 is inserted via a through-hole formed via the circuit board 9 and connected to the circuit pattern provided on a rear surface of the circuit board 9 by soldering.

The bearing holder 4 is fitted in both end portions thereof with ball bearings 11 and 12, respectively, which rotatably support a revolving shaft 14 of a rotor 13 therein. The bearing holder 4 is provided therein with a coiled spring 15 so as to be positioned inside the bearing 12 in a longitudinal direction of the bearing holder 4. The revolving shaft 14 is fitted on one end thereof with a snap ring 16 and is tightly fitted at the other end thereof in a through-hole 17a formed via a central portion of a first cup-like member 17. The first cup-like member 17 is fixedly mounted on an inner peripheral surface thereof with a permanent magnet 18 providing a plurality of magnetic poles. The first cup-like member 17 is securely mounted thereon with a second cup-like member 19. The second cup-like member is fixedly mounted on an outer peripheral surface thereof with a plurality of blades 20.

Now, the bearing holder 4 will be more detailedly described hereinafter with reference to FIGS. 3 to 6.

The bearing holder 4 is integrally formed of a plastic resin material such as polybutylene terephthalate or the like which is reinforced by a reinforcing agent added thereto by injection molding. The bearing holder 4 includes a hollow cylindrical holder body 41, which is provided on an inner surface thereof with a plurality of or three strip-like projections 42a to 42c in a manner to be radially inwardly projected therefrom, extend in an axial or longitudinal direction of the cylindrical holder body 41 and spaced from each other at equal intervals in a circumferential direction of the cylindrical holder body 41. Also, the cylindrical holder body 41 is provided on an inner surface of portions 43a to 43c thereof defined among the projections 42a to 42c with a plurality of or three stoppers 44a to 44c. The cylindrical holder body 41 is formed at both ends thereof with a plurality of or six slits 45a to 45f and a plurality of or six slits 46a to 46f so as to extend in the longitudinal direction thereof and interpose each of the projections 42a to 42c between each adjacent two of the slits, respectively. Thus, the slits each are arranged so as to extend along each of both sides of each of the projections 42a to 42c. Also, the slits each are formed in a manner to extend at one of both ends thereof to a surface of the end of the holder body to thereby be open at the end surface of the holder body 41. The portions 43a to 43c of the cylindrical holder body 4 are provided on an outer surface of one end thereof with an arcuate flanges 47a to 47c, respectively. The portions 43a to 43c are provided at the other end thereof with extensions 48a to 48c so as to outwardly extend therefrom in the longitudinal direction thereof, respectively. The flanges 47a to 47c are provided on an outer periphery thereof with projections 47a1 to 47c1 so as to extend toward the other end of the the portions 43a to 43c in the longitudinal direction thereof, respectively. The projections 47a1 to 47c1 is adapted to be melted when the flanges 47a to 47c of the bearing holder 4 are connected to the cutout 21a, resulting in accomplishing joining therebetween by welding. The extensions 48a to 48c are adapted to be subject to thermal deformation after the stator 8 is fitted on the bearing holder 4, to thereby be caulked with respect to the bobbins 6, to thereby readily engaged with the stator 8.

Figure 6:
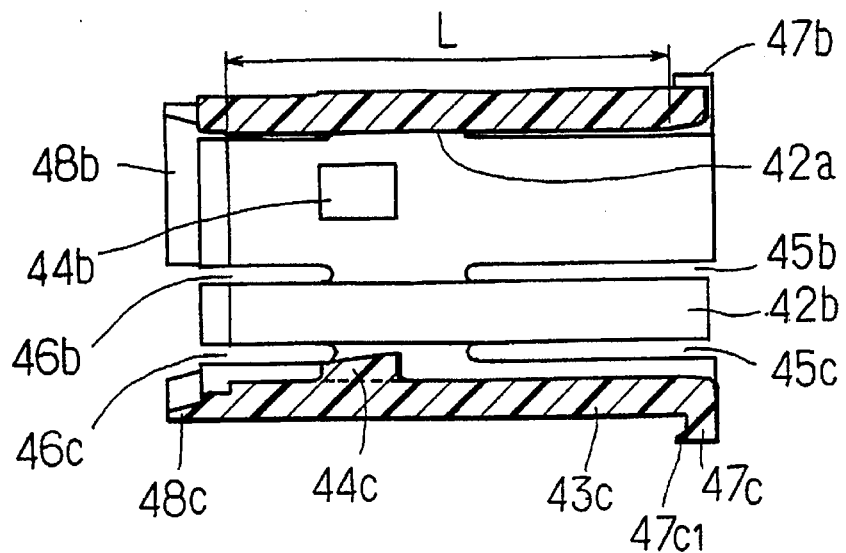
FIG. 6 is a sectional view taken along line VI—VI of FIG. 4.

As will be understood from the foregoing, the projections 42a to 42c are formed into a strip-like shape so as to continuously extend in the longitudinal or axial direction of the cylindrical holder body 41. Also, the projections 42a to 42c each are formed into a length L slightly smaller than that of the cylindrical holder body 41, as shown in FIG. 6. Further, the projections 42a to 42c each are formed at each of both ends thereof with a depression or a slope, to thereby facilitate insertion of the bearings 11 and 12 thereinto. The projections 42a to 42c cooperate at one end portion thereof defined in the longitudinal direction thereof with each other to define, on an inside thereof, a first bearing receiving space for receiving the bearing 11 therein. Likewise, the projections cooperate at the other end portion thereof with each other to define, on an inside thereof, a second bearing receiving space for receiving the bearing 12 therein.

Figure 7:
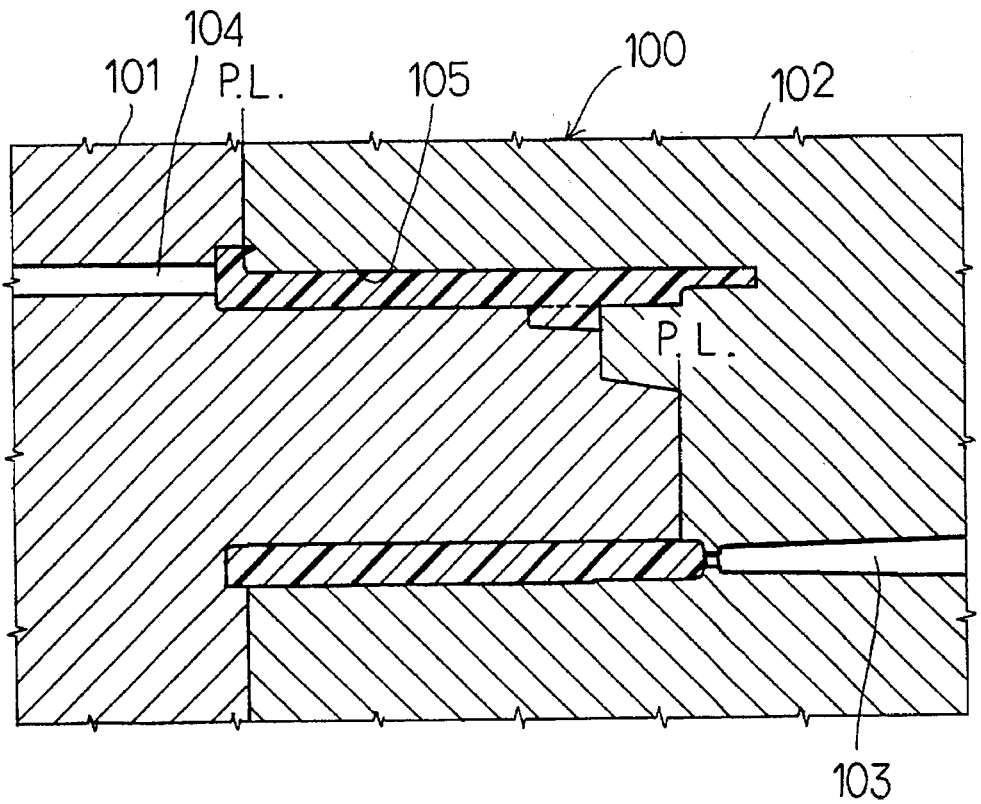
FIG. 7 is a sectional view showing a mold used for forming a bearing holder of the present invention by injection molding.

The projections 42a to 42c, as described above, are arranged so as to continuously extend in the longitudinal direction of the holder body 41. This indicates that the projections 42a to 42c each are free of any parting line on a surface thereof and made by means of a single mold. A parting line is a line formed on an article by a parting face of a mold when the article is formed by injection molding. FIG. 7 illustrates a mold 100 used for monolithic molding of the bearing holder 4. The mold 100 is constituted by two mold parts 101 and 102 combined with each other on abutment surfaces of the parts 101 and 102. The abutment surfaces constitute a parting face of the mold, which forms a parting line on a molded article. In the illustrated embodiment, the mold parts 101 and 102 are shaped so as to permit all the projections 42a to 42c to be formed together by only the mold part 101. Thus, dimensional accuracy of the projections 42a to 42c depends on that of the mold part 101, so that accurate alignment between the axes of the first and second bearing receiving spaces may be ensured by an increase in dimensional accuracy-of the mold part 101. In FIG. 7, reference numeral 103 designates a port through which a plastic resin material is charged in the mold, 104 is an ejector pin for ejecting a molded article from the mold, and 105 is a cavity.

The projections 42a to 42c are formed at the inner surface thereof into an arcuate shape so as to conform with an outer peripheral surface of the bearings 11 and 12. A width of each of the projections 42a to 42c or a dimension thereof in a direction perpendicular to the longitudinal direction thereof is determined to be smaller than a width of each of the portions 43a to 43c defined between each adjacent two of the projections. This permits stress applied to the bearings 11 and 12 from the projections 42a to 42c to be minimized. In the illustrated embodiment, the cylindrical holder body 4 is so formed that an inner cylindrical space defined by the inner peripheral surface thereof has a diameter r1 of about 4.3 mm and and a cylindrical space defined by connecting the inner surfaces of the projections 42a to 42c to each other in a circumferential direction thereof has a radius r2 of about 4 mm smaller than a radius of each of the bearings 11 and 12 extending from a center thereof to an outer peripheral surface thereof. Also, the projections 42a to 42c are formed so as to be radially inwardly projected by a dimension of about 0.3 mm.

The bearing 11 is housed in the first bearing receiving space in such a manner that the bearing 11 is abutted at one end thereof against the stoppers 44a to 44c and at the other end thereof against an inner bottom surface of the first cup-like member, to thereby be prevented from moving or shifting in the axial or longitudinal direction of the cylindrical holder body 41. Likewise, the bearing 12 is housed in the second bearing receiving space in a manner to be abutted at one end thereof against the stoppers 44a to 44c through the spring 15 and at the other end thereof against the snap ring 16 fitted on the revolving shaft 14. Therefore, in the illustrated embodiment, "one end" of each of the bearings which indicates an inner end of the bearing which is defined in the longitudinal direction based on the bearing which was arranged in the holder, whereas "the other end" thereof indicates an outer end of the bearing likewise defined.

Thus, rotation of the fan causes generation of force in a direction of separating the revolving shaft 14 from the housing; however, in the illustrated embodiment, the spring member 15 interposed between the bearing 12 and the stoppers 44a to 44c acts as a shock absorber which prevents the force being applied to the bearing 12.

The slits 45a to 45f and 46a to 46f act to minimize generation of stress due to a variation in dimension of the bearing holder 4 with time and by application of heat thereto, to thereby minimize application of undue force due to the stress to the bearings 11 and 12. In order to ensure that the slits 45a to 45f and 46a to 46f effectively exhibit such a function, the slits; each are formed into a length or a dimension in the longitudinal or axial direction of the cylindrical holder body larger than that of each of the bearings 11 and 12. More particularly, the slits each are formed so as to inwardly extend, in the axial direction of the bearing holder, to a position corresponding to an intermediate portion of an outer peripheral surface of each of the bearings 11 and 12 arranged in the holder body beyond the outer end of the bearing. More specifically, the slits may be formed so as to inwardly extend by about 0.5 mm beyond the outer end of each of the bearings. Also, the slits each are preferably formed into a width of 0.5 to 1 mm in order to ensure satisfactory distribution of plastic resin during molding.

In the illustrated embodiment, a ball bearing may be used as each of the bearings 11 and 12.

In the illustrated embodiment, arrangement of the slits 45a to 45f and 46a to 46f promotes release of the stress. However, when the bearings 11 and 12 are constructed so as to exhibit increased mechanical strength, arrangement of the slits can be eliminated.

Figure 8:
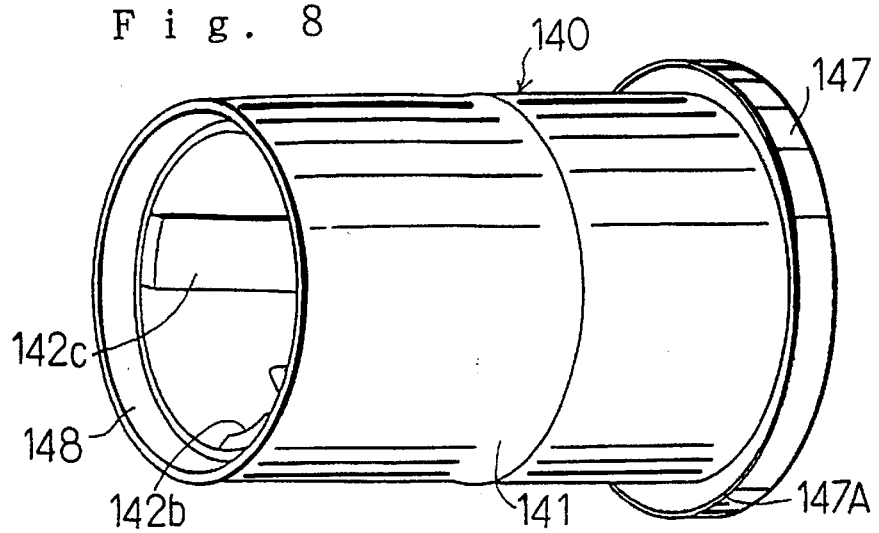
FIG. 8 is a perspective view showing another embodiment of a bearing holder according to the present invention.
Figure 9:
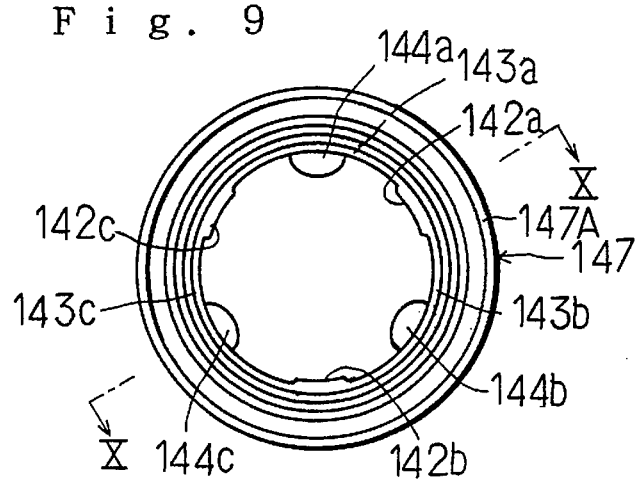
FIG. 9 is a side elevation view of the bearing holder shown in FIG. 8.
Figure 10:
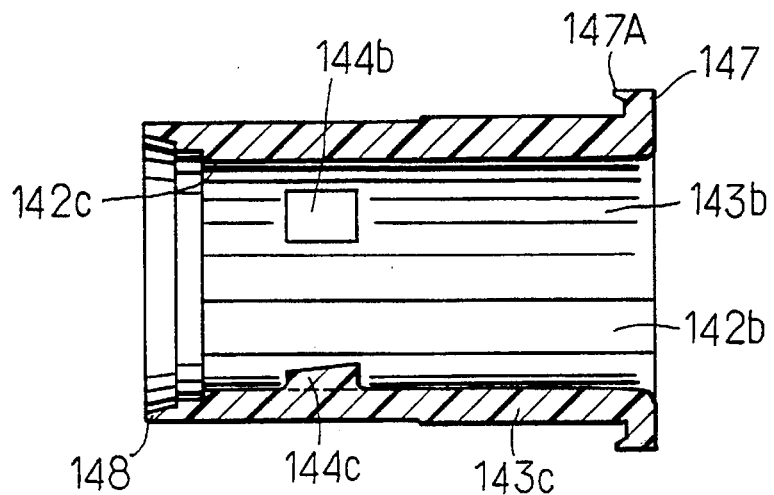
FIG. 10 is a sectional view taken along line X—X of FIG. 9.

Referring now to FIGS. 8 to 10, a bearing holder 140 free of such slits as described above is illustrated. In FIGS. 8 to 10, parts or components in the illustrated embodiment corresponding to those in the embodiment described above with reference to FIGS. 3 to 6 are designated at reference numerals represented by adding one hundred to reference numerals used for indicating the parts in the above-described embodiment. In the bearing holder 140 of the illustrated embodiment, a flange 147 and an extension 148 are formed so as to extend over a whole outer periphery of a hollow cylindrical holder body 141 and a whole inner periphery thereof. The flange 147 is likewise provided thereon with a projection 147A. Three projections 142a to 142c which are free of any parting line are provided on an inner surface of the holder body 141 as in the above-described embodiment. In the bearing holder 140 of the illustrated embodiment which is free of such slits as described above, the holder body 141 is preferably constructed in such a ratio of a width of each of the projections 142a to 142c or a dimension thereof in a direction perpendicular to a longitudinal or axial direction of the holder body 141 to a width of each of portions 143a to 143c of the holder body which are not contacted with bearings is 1:2 or more. Such construction minimizes application of stress to bearings. Also, each of the portions 143a to 143c which is defined between each adjacent two of the projections 142a to 142c is preferably formed into a minimum thickness. Further, the projections 142a to 142c and portions 143a to 143c are preferably formed so that a ratio of a thickness of the former to that of the latter is about 1:3.

Mounting of each of the bearing holders 4 and 140 in the housing 2, as shown in FIGS. 1 and 2, is carried out by connecting each of the flanges 47a to 47c and 147 to the cut-out step 21a of the base section 21a of the housing 21 by welding. Alternatively, the bearing holder and housing may be formed in a manner to be integral with each other.

In each of the embodiments described above, the bearing holder is applied to a brushless motor used as a drive source of a fan. However, the bearing holder of the present invention is applicable to other small-sized rotary electric equipments.

The bearing holder of each of the embodiments is provided with three such projections for holding the bearings, however, the number of projections may be set as desired depending on a diameter of the bearing holder. It is preferable that three or more such projections are arranged at equal intervals.

Figure 11:
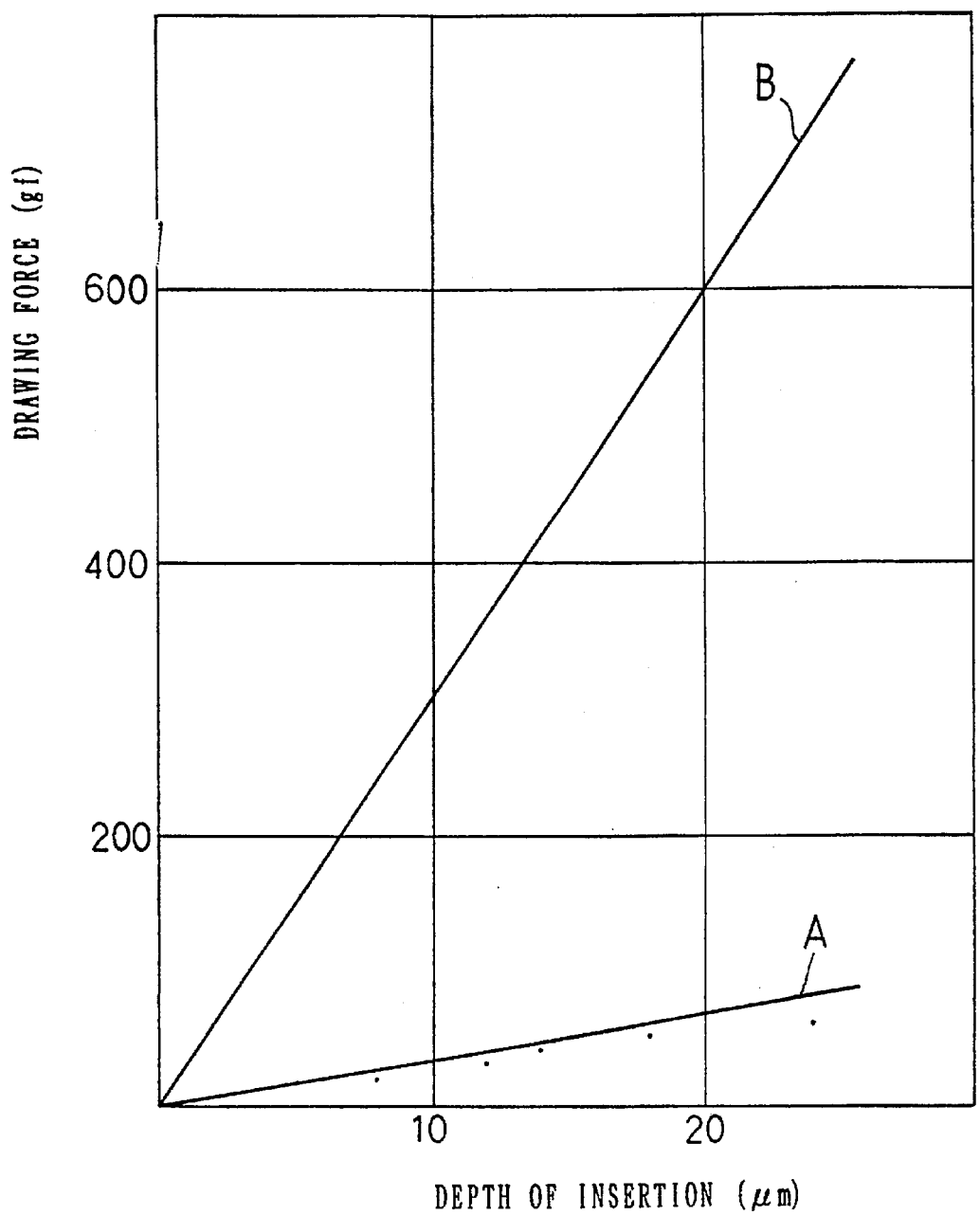
FIG. 11 is a graphical representation showing a relationship between a depth of insertion or press-fitting of a bearing into a bearing holder and force required for drawing the bearing out of the bearing holder which was measured on each of a bearing holder of the present invention and a conventional one.

An experiment was made for measuring alignment precision of two bearings held in each of the bearing holder of the present invention and a bearing holder manufactured according to the teachings of U.S. Pat. No. 4,682,065 described above. As a result, it was found that the bearing holder of each of the embodiments reduces a deviation between axes of the two bearings to a level as small as about 15 μm. The deviation is due to deformation of the bearing holder during molding. On the contrary, the bearing holder manufactured according to the U.S. patent caused the deviation to be as large as about 80 μm. The deviation is due to a deviation in precision of a mold and deformation of the bearing holder during molding. Also, stress applied from the bearing holder to the bearings was measured. It is known that stress applied to the bearings is proportional to force required for drawing the bearings out of the bearing holder. Thus, each of the bearing holder of the embodiment described above with reference to FIGS. 3 to 6 and the bearing holder made according to U.S. Pat. No. 4,682,065 was subject to an experiment for determining a relationship between a depth of insertion or press-fitting of the bearings into the bearing holder and the drawing force. The results were as shown in FIG. 11, which indicates that the bearing holder of the present invention (line A) substantially reduces the drawing force and therefore stress applied to the bearings as compared with that of the U.S. patent (line B).

As can be seen from the foregoing, in the present invention is so constructed that a plurality of the projections are provided on the inner surface of the holder body. Such construction permits axes of the first bearing receiving space defined at one end of the holder body and second bearing receiving space defined at the other end thereof to be aligned with each other.

Also, in the conventional bearing holder, two bearing receiving spaces are separately formed by means of separate molds. Thus, in order to align axes of the bearing receiving spaces with each other, it is required to carry out processing and assembling of the molds with highly increased precision. On the contrary, in the present invention, the plural mold parts each are arranged so that parting surfaces of the mold are positioned in a manner not to cause any parting line to be formed on a surface of each of the projections of the holder body, resulting in ensuring accurate alignment between the axes of both bearing receiving spaces.

While preferred embodiment of the invention have been described with a certain degree of particularity with reference to the drawings, obvious modifications and variations are possible in light of the above teachings. It is therefore to be understood that within the scope of the appended claims, the invention may be practiced otherwise than as specifically described.

What is claimed is:

1. A brushless DC motor comprising:

a stator;

a rotor including a revolving shaft and rotated outside said stator;

a bearing holder integrally formed of plastic resin so as to hold therein a pair of bearings for supporting said revolving shaft; and a housing formed of plastic resin for fixedly supporting said bearing holder thereon;

said bearing holder including a holder body formed into a hollow cylindrical shape;

said holder body being provided on an inner surface thereof with a plurality of projections in a manner to be radially inwardly projected therefrom and spaced from each other at predetermined intervals in a circumferential direction of said holder body;

said projections each being arranged so as to be contacted with an outer periphery of each of said bearings to hold said bearings in said holder body a spaced distance apart;

said projections each being formed so as to continuously extend in a longitudinal direction of said holder body over both bearings and the space between the bearings.

2. A brushless DC motor as defined in claim 1, wherein said projections are arranged so as to be spaced from each other at equal intervals in said circumferential direction.

3. A brushless DC motor as defined in claim 1, wherein said holder body is formed at each of both ends thereof with a plurality of slits in a manner to be open at the end of said holder body and extend in the longitudinal direction of said holder body;

said slits each being arranged along each of both sides of each of said projections.

4. A brushless DC motor as defined in claim 3, wherein said slits each are formed so as to extend inwardly in said longitudinal direction to a position corresponding to an intermediate portion of an outer peripheral surface of each of said bearings arranged in said holder body.

5. A brushless DC motor as defined in any one of claims 1 to 4, wherein said holder body is provided at a portion thereof interposed between each adjacent two of said projections with a stopper against which an inner end of one of said bearings which is defined in the longitudinal direction on the basis of the bearing arranged in said holder body is abutted.

6. A brushless DC motor as defined in claim 5, wherein said holder body is provided therein with a spring in a manner to be positioned between each of said stoppers and an inner end of the other of said bearings which is defined on the basis of the bearing arranged in said holder body is abutted.

7. A brushless DC motor as defined in claim 3, wherein said portion of said holder body interposed between each adjacent two of said projections is formed at a distal end thereof with an extension which is adapted to be radially outwardly caulked, to thereby be engaged with said stator.

8. A brushless DC motor as defined in claim 1, wherein said holder body of said bearing holder is formed on an end side thereof on which said bearing holder is fixed with a flange;

said bearing holder being jointed to said housing through said flange.

9. A brushless DC motor as defined in claim 3, wherein said projections each are formed into a dimension in a direction perpendicular to said longitudinal direction smaller than that of said portion defined between said each adjacent two projections.

10. A brushless DC motor as defined in claim 1, wherein said bearings each are a ball bearing.

11. A brushless DC motor comprising:

a stator;

a rotor including a revolving shaft and rotated outside said stator;

a bearing holder integrally formed of plastic resin so as to hold therein a pair of bearings for supporting said revolving shaft; and a housing formed of plastic resin for fixedly supporting said bearing holder thereon;

said bearing holder including a holder body formed into a hollow cylindrical shape;

said holder body being provided on an inner surface thereof with a plurality of projections in a manner to be radially inwardly projected therefrom and spaced from each other at predetermined intervals in a circumferential direction of said holder body;

said projections each being arranged so as to be contacted with an outer periphery of each of said bearings to hold said bearings in said holder body a spaced distance apart;

said projections each being formed so as to continuously extend in a longitudinal direction of said holder body over said bearings and the space between said bearings and without being formed thereon with any parting line.

12. A bearing holder integrally formed of plastic resin for holding therein a pair of bearings for supporting a revolving shaft, comprising:

a holder body formed into a hollow cylindrical shape;

said holder body being provided on an inner surface thereof with a plurality of projections in a manner to be radially inwardly projected therefrom and spaced from each other at predetermined intervals in a circumferential direction of said holder body;

said projections each being arranged so as to be contacted with an outer periphery of each of said bearings to hold said bearings in said holder body a spaced distance apart;

said projections each being formed so as to continuously extend in a longitudinal direction of said holder body over said bearings and the space between said bearings and without being formed thereon with any parting line.

13. A bearing holder as defined in claim 12, wherein said holder body is formed at each of both ends thereof with a plurality of slits in a manner to be open at the end of said holder body and extend in the longitudinal direction of said holder body;

said slits each being arranged along each of both sides of each of said projections.

14. A bearing holder as defined in claim 12, wherein said holder body is provided at a portion thereof interposed between each adjacent two of said projections with a stopper against which an inner end of one of said bearings which is defined on the basis of the bearing arranged in said holder body is abutted;

said portion defined between said each adjacent two projections being provided at an one end thereof with a radially extending flange;

said flange being formed with a projection which extends toward the other end of said portion.

15. A method for manufacturing a bearing holder as defined in claim 12 by injecting synthetic resin into a cavity of a mold formed by a combination of a plurality of mold parts, wherein said plural mold parts each are arranged so that parting surfaces of said mold are positioned in a manner not to cause any parting line to be formed on a surface of each of said projections.

* * * * *